Feb. 8, 1927.

H. A. DENMIRE 1,617,012

MACHINE FOR CUTTING FABRIC ON THE BIAS

Filed May 17, 1923 5 Sheets-Sheet 1

INVENTOR
*Harold A. Denmire*
BY
ATTORNEY

Feb. 8, 1927.
H. A. DENMIRE
1,617,012
MACHINE FOR CUTTING FABRIC ON THE BIAS
Filed May 17, 1923
5 Sheets-Sheet 2
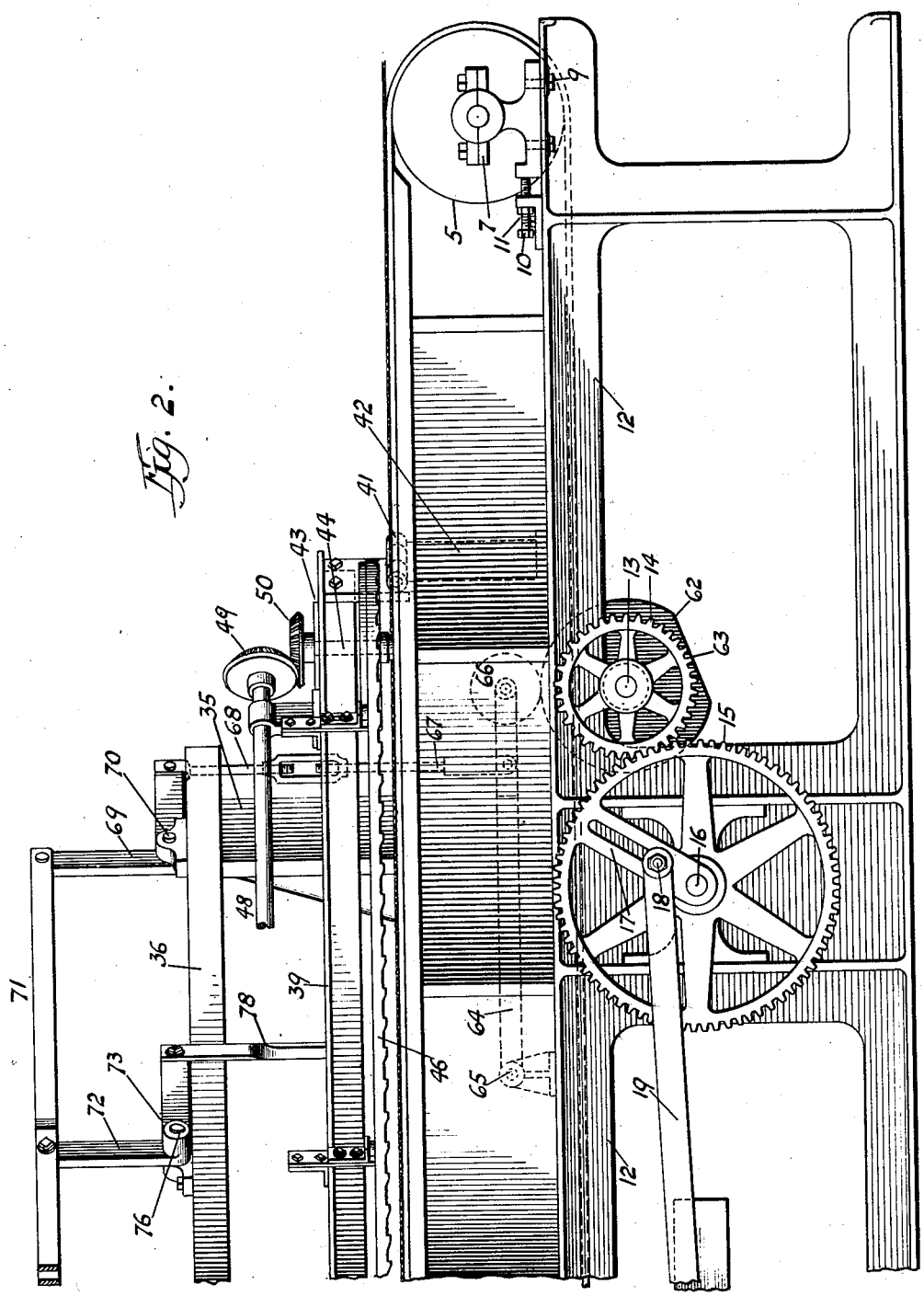
Fig. 2.
INVENTOR
Harold A. Denmire
BY
ATTORNEY

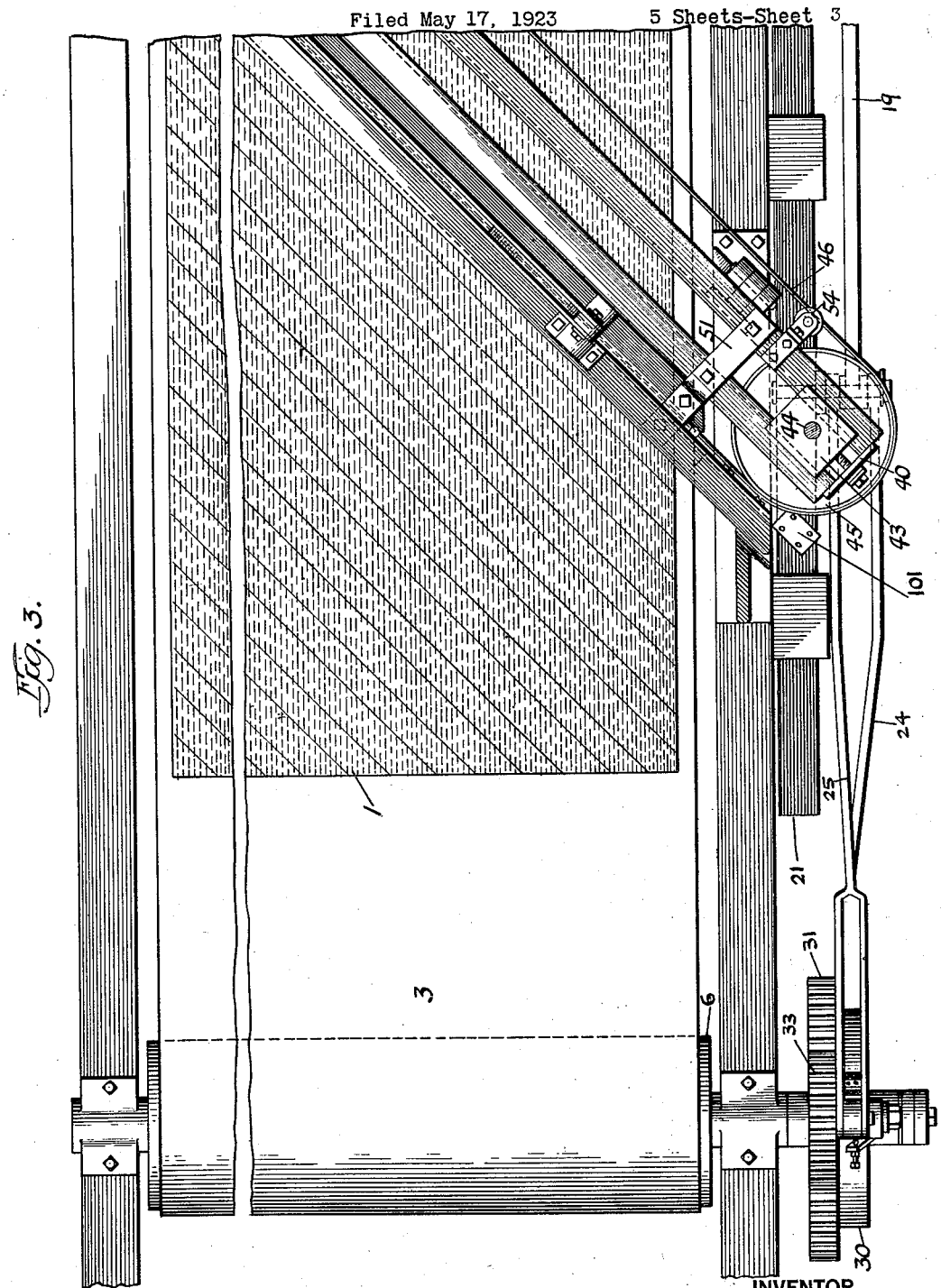

Feb. 8, 1927.                                    1,617,012
H. A. DENMIRE
MACHINE FOR CUTTING FABRIC ON THE BIAS
Filed May 17, 1923      5 Sheets-Sheet 4
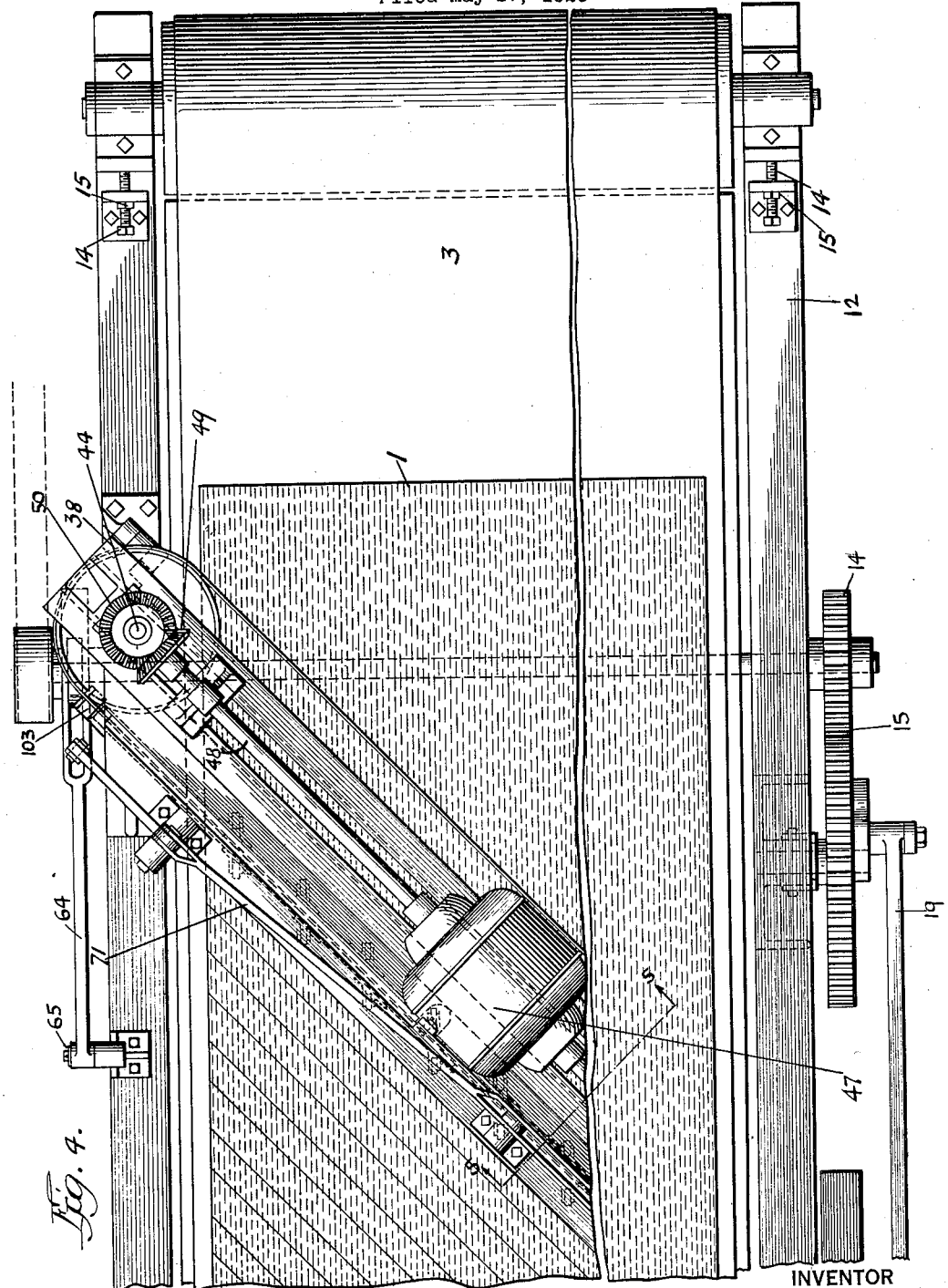
INVENTOR
Harold A. Denmire
BY 
ATTORNEY Feb. 8, 1927. 1,617,012
H. A. DENMIRE
MACHINE FOR CUTTING FABRIC ON THE BIAS
Filed May 17, 1923 5 Sheets-Sheet 5
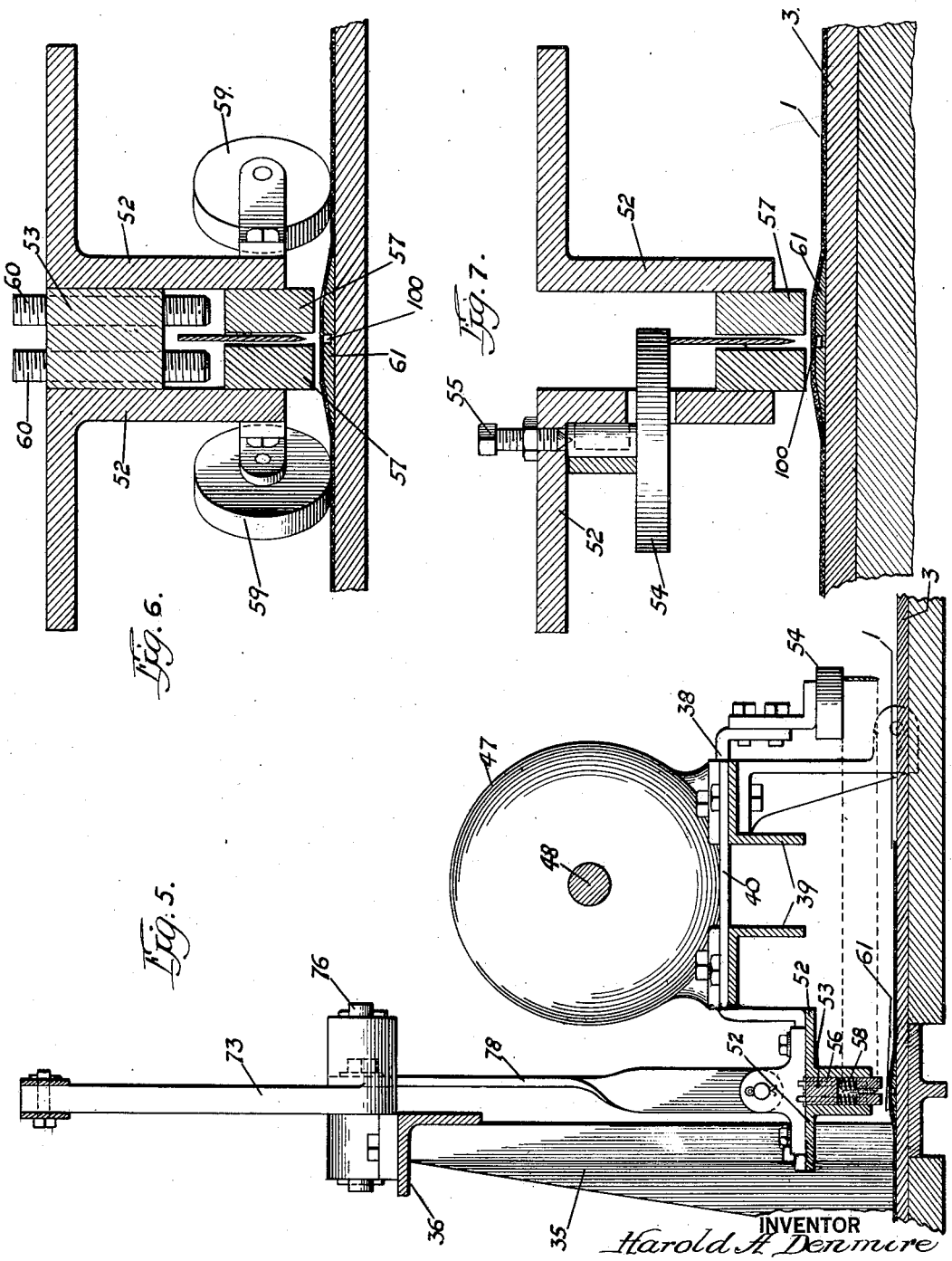
INVENTOR
Harold A. Denmire
BY
ATTORNEY Patented Feb. 8, 1927.

1,617,012

UNITED STATES PATENT OFFICE.

HAROLD A. DENMIRE, OF AKRON, OHIO, ASSIGNOR TO THE GENERAL TIRE AND RUBBER COMPANY, OF AKRON, OHIO, A CORPORATION OF OHIO.

MACHINE FOR CUTTING FABRIC ON THE BIAS.

Application filed May 17, 1923. Serial No. 639,509.

The invention herein disclosed involves carrying forward and improving the invention set forth in my prior application Serial No. 592,779, filed October 6, 1922.

This invention relates to a machine for cutting material, such as fabric, and is particularly directed to a machine for cutting fabric which has been impregnated and coated with rubber, such as used in the manufacture of pneumatic tires, although it is not necessarily restricted to operation on this type of fabric.

In the manufacture of pneumatic tires or other articles of rubber and fabric, it is necessary to cut the fabric which enters into the tire structure in narrow strips at an angle of 45° to the length of the original fabric, or "on the bias." Machines for cutting the fabric into these narrow strips are known as "bias machines" and there have been in common use two types of machine, classified as horizontal or vertical bias cutters.

In the horizontal type of bias cutter, the fabric is conducted over a table on which the fabric is severed by a vertically operating blade, the fabric being advanced under the cutter by a plurality of gripping fingers. In the vertical type of bias cutter, the fabric hangs in a vertical plane and a reciprocating knife arranged at the proper angle cuts the fabric into the desired strips.

Among other disadvantages of the existing machines of the types referred to above, the cuts are often inaccurate and irregular and a considerable waste results. This is largely due to tension exerted upon the end of the fabric which causes it to stretch, the return of the fabric to normal condition causing distortion and unevenness in the final strip.

It is the object of this invention to provide a machine for cutting fabric on the bias in which the fabric is fed in such a manner that no tension whatever will be exerted on it, and all stretching and distortion thereof will be eliminated.

It is a further object of this invention to provide a machine that will be simple in construction, rapid in its operation and accurate in its results.

These and other features of the invention will appear more fully from the following detailed description when read in connection with the accompanying drawings and will be pointed out in the appended claims.

In the drawings:

Figure 2 is a side elevation in continuation of Figure 1;

Figure 3 is a top plan view;

Figure 4 is a top plan view in continuation of Figure 3;

Figure 5 is a cross-section on the line 5—5 of Figure 4;

Figure 6 is an enlarged section across the band knife;

Figure 7 is a section at another point across the knife;

Figure 8 is a detail of the cutter bar.

Figure 1:
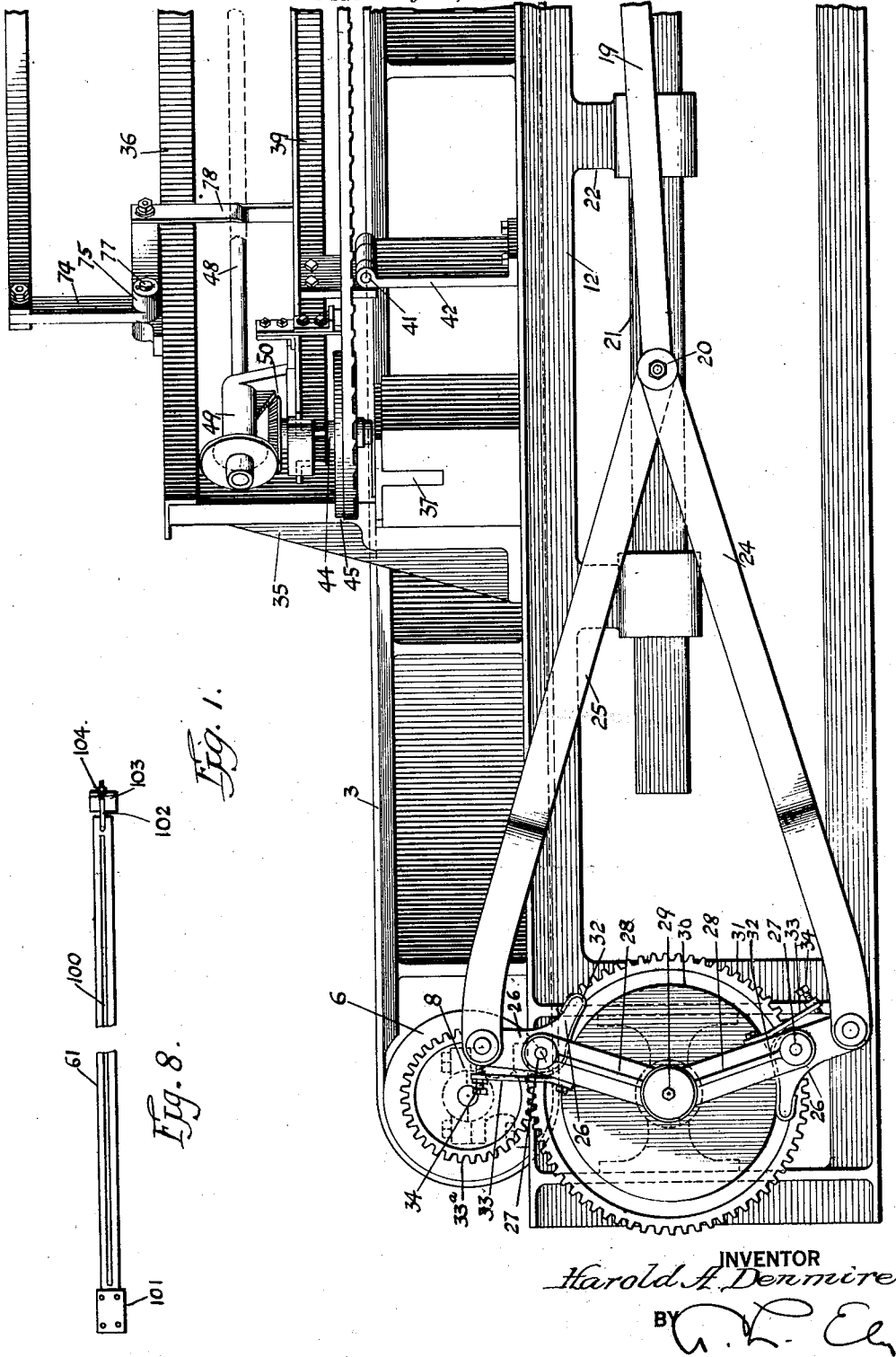
Figure 1 is a side elevation of a machine selected to illustrate my invention.

The fabric 1, which it is desired to cut, preferably rubberized and rubber coated fabric, is thoroughly impregnated with rubber in any suitable manner. For supporting and feeding the fabric, I employ an endless conveyor belt 3 of any suitable material, such as rubber, fabric, or the like.

The belt is supported in a horizontal plane on two pulleys 5 and 6, the former of which is an idler and the latter a feed pulley. The pulleys 5 and 6 are supported on a framework 12. In order to secure the proper tension on the belt 3, provision is made for relative adjustment of the pulleys 5 and 6. To this end the bearings 7 and 8 are retained in position by screws 9 which extend through elongated slots in the frame 12. Abutment screws 10 are conveniently mounted upon the frame 12 to engage the side of the bearings, the position of these screws determining the position of the bearings in a manner clearly understood. The usual lock nut 11 is provided to hold the screws 10 in adjusted position.

In the framework is mounted a main shaft 13, driven from any suitable source and carrying a gear 14 which meshes with a second gear 15 having twice its number of teeth. The gear 15 is supported on shaft 16 and carries a crank 17 in the end of which is secured for adjustment toward and from the shaft 16, a crank pin 18. A link 19 is connected at one end to the pin 18 and at the other to a pin 20 carried on a sliding bar 21 that is supported in guides 22 depending from the framework.

On the pin 20 are pivoted links 24 and 25 which are forked at their other ends and adapted to pivotally embrace two pawls or dogs 26 which are pivoted at 27 to the ends of rocker arms 28 carried on a shaft 29 mounted in the framework below the pulley 6. The inner faces of the dogs 26 are arc-shaped to conform to the surface of a drum-shaped flange 30 formed on the face of a gear 31 on the shaft 29, the gear 31 meshing with a gear 33ª secured to the pulley 6. The faces of the dogs are covered with a friction surface 32 to grip the drum. Both of the pawls are pointed in the same direction, and cooperate to rotate the shaft 29 in clockwise direction, the upper pawl effecting a pulling engagement with the drum 30 and the lower one a pushing one. In order to adjust the effective stroke of the pawls, heavy plates 33 are mounted upon the arms 28 and are provided with adjustable screws 34 adapted to engage the upstanding arm of the pawls and cause the latter to rotate around their pivots, thereby disengaging the actual face of the pawls from the drum 30.

By this mechanism, it will be seen that the belt is given an intermittent travel in one direction by the rotation of the shaft 13, a complete rotation of the shaft serving to advance the belt two steps with a slight pause between steps due to the disengagement of the pawl from the drum. By the adjustment of the screws 34, the amount of feed can be accurately predetermined. Furthermore, as it is sometimes desirable, a variation in the length of successive feeds may be effected by adjusting the screw of each pawl to different positions. Thus it is possible to cut alternate strips of different width, the desirability of which will be readily recognized by those skilled in the art of assembling the plies in the construction of a tire.

Secured to the framework on opposite sides of the belt are standards 35 which are arranged in angular position relative to the belt so as to obtain the proper angle of cut, the uprights being connected by a cross bar 36. Paralleling the cross bar beneath the upper run of the belt is a T-shaped bar 37.

A knife carrying frame 38 consisting of two parallel angle-bars 39, connected at each end by cross bars 40, is pivoted at 41 to standards 42 secured to the framework. The pivots 42, it will be noted, are arranged on a line with the upper face of the belt, the construction being such as to insure the knife meeting the fabric at right angles, as will more clearly appear further on.

Upon each end of the frame is mounted an adjustable bearing 43 which carries a vertical shaft 44. On the lower end of the shaft and between the frame and the belt is a driven pulley 45 around which the band knife 46 is trained. Located centrally upon the upper side of the frame is a motor 47, the rotor of which is extended to provide a driving shaft 48 having on the ends thereof bevel gears 49 which mesh with gears 50 upon the upper end of the pulley shafts 44.

Extending rearwardly from the cutter frame are brackets 51 adapted to rigidly support two parallel angle-bars 52 between which the rear run of the knife is directed. The angle-bars are connected together by a plurality of spacer blocks 53, the upper faces of which are flush with the top face of the bars. Mounted upon vertical pivots on one of the angle-bars 52 are a plurality of rollers 54 adapted to bear upon the upper edge of the band knife 46 and force it through the fabric in a manner presently to appear. The rollers 54 are vertically adjustable by the screws 55 to compensate for the wear of the knife. Mounted upon pins 56 slidable in apertures in the blocks 53 is a plurality of pressure elements 57 arranged for telescopic movement between the vertical face of the angle-bars 52. Springs 58 encircle the pins 56 and bear upon the top of the pressure elements to force the latter into yielding engagement with the fabric during the cutting operation. The springs 58 normally hold the pressure elements below the ends of the angle-bars so that the fabric will be first engaged and firmly held against the belt upon downward movement of the cutter and frame, the arrangement being such that upon further downward movement, the pressure elements will retreat between the bars and allow the cutter to engage the fabric. It will be seen from this construction that the fabric is held against movement prior to and during the cutting operation. As a further precaution against undesirable movement of the fabric, a plurality of rollers 59 are mounted upon the lower end of the angle-bars 52 and are adapted to press and hold the fabric upon the belt at spaced points.

To limit the downward travel of the knife, adjustable stop screws 60 are carried by the blocks 53 and are adapted to engage the top face of the pressure members 57. It will be seen that the limit of the downward stroke of the knife may be predetermined by adjustment of the screws 60.

In order to prevent the blade of the cutter from penetrating the belt and to eliminate injurious cuts thereto, a bar 61, which is provided with a groove 100, is arranged above the belt and provides an opening in which the cutting edge is received. The fabric travels above the bar 61 and is spaced from the belt at the cutting line. From this construction it will be evident that a strip will be completely severed and the downward movement of the cutter arrested by the screws 60 without the cutting edge of the knife penetrating the belt.

The means for oscillating the knife and frame about the pivot 41 will now be described. Mounted upon the main shaft 13 is a cam 62 having a flat portion 63 on the periphery thereof. An arm 64 pivoted to the frame at 65 carries a roll 66 adapted to ride upon the periphery of the cam.

The arm 64 is adjustably connected through links 67 and 68 to one arm of an elbow lever 69 pivoted at 70 to the cross bar 36. The other arm of the lever 69 is connected by link 71 to arms 72 and 74 of elbow levers 73 and 75 respectively pivoted to the cross bar at 76 and 77. Vertically extending links 78 pivotally connect the other arm of the levers 73 and 75 to the cutter frame. It will thus be seen that the cutter is oscillated toward and from the work by the cam 62, the latter being so positioned on the shaft 13 as to cause the cutter to engage the fabric at the period of pause between the feeding steps.

The arrangement of the described parts is such that when the parts are in normal position, the cutter will be held in its raised position by the concentric part of the cam 62. Simultaneously with the pause in the feed of the fabric, due to the dead center position of the crank pin 18 and the disengagement of the dogs 26 from the drum 30, the roller 66 falls upon the flat portion 63 of the cam 62 and the frame is swung about the pivots 41 and the cutter drawn across the fabric. By locating the pivots 41 in alignment with the upper edge of the belt, the edge of the knife will be exactly normal to the surface of the fabric and a clear, accurate cut will result.

The cutter bar 61 is necessarily thin and flexible as to permit only a slight raising of the fabric from the belt, and it is therefore advisable to provide means for holding the bar under tension. This is performed by attaching the bar to a rigid bracket 101 at one side of the framework, while the other end of the bar is fastened to an adjusting screw 102 which passes through and is held in a bracket 103 by nut 104. In this manner the bar is held under tension as desired.

Since the manner in which the different parts operate to perform their function and the sequence of the operation as a whole have been set forth in connection with the detailed description of the machine, no further description of the operation is necessary for an understanding of the invention.

Having described the invention, what I claim as new and desire to secure by Letters Patent of the United States is:

1. A machine for cutting fabric comprising a conveyor for supporting the fabric means for advancing the conveyor intermittently, a traveling knife, means to actuate the knife to cut the fabric while it is supported on the conveyor and means to cause automatic alternate operative movements of the conveyor and the knife.

2. A machine for cutting fabric comprising a conveyor, a vertically movable knife carrier midway of the conveyor, a knife on said carrier, movable longitudinally thereof and arranged to cut the fabric on the conveyor at the lower limit of movement of the carrier, and means to move the conveyor intermittently, operative automatically only during the period that the carrier is elevated.

3. A machine for cutting fabric comprising, in combination, a movable support, a pivotally mounted carrier, a continuously traveling member having cutting surfaces thereon movable in the carrier, and means for moving the carrier toward and from the support.

4. A machine for cutting fabric on the bias having, in combination, a movable support for a fabric, a band having a plurality of cutting surfaces thereon and movable continuously in a substantially horizontal plane above said support, and means for oscillating the knife to cause it to enter and cut the fabric.

5. A machine for cutting fabric having, in combination, a support for the fabric, a band having a plurality of cutting surfaces thereon above said support, means for driving the band continuously, and means for oscillating said knife to cause it to enter and cut the fabric.

6. A machine of the class described having, in combination, a support for the work, a frame, pivots for said frame lying on opposite sides of the support, a knife carried by the frame, and means to cause the frame to oscillate about the pivots toward and away from the support.

7. A machine of the class described having, in combination, a support for the work, a band knife, and means for oscillating the knife about an axis lying along the top surface of said support.

8. A machine of the class described having, in combination, a support for the work, a pivoted frame, a band knife carried by said frame, means on the frame for driving said knife, and means for moving the knife in a position normal to the support to cause the knife to operate upon the work.

9. A machine of the class described having, in combination, a conveying belt, a moving member having cutting surfaces thereon movable transversely of the belt, means to actuate the member so as to bring it into cutting relation to the material on the belt, means to hold the fabric adjacent to the line of cut, and automatic means to alternate the movement of the belt and the actuation of the member.

10. A machine of the class described having, in combination, a movable support for the material to be cut, a continuously moving cutting element, means to oscillate the cutting element and thus bring it into and out of cutting relation to the material, and yielding means to clamp the material adjacent the line of cut.

11. A machine of the class described having, in combination, a movable support for fabric, a continuously moving knife, means to bring the knife into cutting relation with the fabric, a plurality of spring pressed means for engaging the fabric adjacent the line of cut, and additional means for clamping the fabric to the support at spaced points.

12. A machine of the class described having, in combination, an endless belt for supporting fabric, means for moving the belt intermittently, a knife, means to actuate the knife to cut the fabric on the belt, means to prevent the knife from penetrating the belt, and automatic means for properly coordinating the movement of the belt and the actuation of the knife.

13. A machine of the class described having, in combination, an endless belt for supporting the work, means for moving the belt intermittently, a continuously moving knife, means to actuate the knife to cut the work, and a stationary support above the belt parallel to the knife and over which the work travels.

14. A machine of the class described having, in combination, an endless belt for supporting the work, means for moving the belt intermittently, an endless knife movable transversely of the belt, driving means for continuously moving the knife, means to raise and lower the knife relative to the belt, and a stationary bar parallel to the knife and over which the work is moved while being cut.

15. A machine of the class described having, in combination, an endless belt for supporting fabric, means for moving the belt intermittently, an endless band mounted transversely of the belt and having cutting surfaces, driving means for continuously moving the knife, means to cause the band and the fabric to approach during pauses in the travel of the belt, and a bar parallel to the band over which the fabric passes for the cutting operation.

16. A machine of the class described having, in combination, an endless belt, a knife carrier, a continuously moving band knife in said carrier, means for guiding the knife, means for moving the knife toward and from the belt, and means to adjust the extent of movement of the knife.

17. A machine for cutting fabric comprising a belt conveyor, a band knife midway of said conveyor, means to drive the knife, means to actuate the knife periodically to cut the fabric upon the conveyor, means to move the conveyor between the operations of the knife, and coordinating means to control automatically the periodical movements of the knife and the conveyor.

18. An apparatus for cutting fabric into narrow strips comprising, an endless belt, a band knife midway of said belt, means to cause the knife to approach the belt periodically to cut the fabric, and automatically operating means to move the belt intermittently during the period that the knife is elevated above the belt.

19. An apparatus for cutting strips of fabric from the leading end thereof comprising, a continuous intermittently movable support for the fabric, a band knife, mechanical means to bring the knife in cutting relation to the fabric, and coordinating means to control automatically the movements of the knife and the support.

20. An apparatus for cutting strips of fabric comprising, a continuous support, a band having cutting surfaces thereon, means to actuate the band to cut the fabric, means to move the support intermittently, and mechanical means to move the band and fabric together and automatically operative during the pauses in the movement of the support.

21. In an apparatus for cutting fabric, a continuously operated band having cutting surfaces thereon, a moving frame in which the band is carried, means for conducting fabric intermittently past the band to predetermined extents, and means for intermittently actuating the frame to and from the fabric, operative automatically during the pauses in the movement of the fabric.

22. In an apparatus for cutting fabric, a continuously operated band knife, an oscillating frame in which the knife is carried, an intermittently movable belt for supporting the fabric and carrying it beneath the knife, and means for actuating the frame to raise and lower the knife during the pauses of the belt.

23. In an apparatus for cutting fabric, a continuously operated band knife, an oscillating frame in which the knife is carried, an intermittently movable belt for supporting the fabric and carrying it beneath the knife, a knife bar over the belt, means for actuating the frame to raise and lower the knife.

24. In an apparatus for cutting fabric, a continuously operated band knife, an oscillating frame in which the knife is carried, an intermittently movable belt for supporting the fabric and carrying it beneath the knife, a knife bar over the belt, means for maintaining the knife bar under tension, and means for actuating the frame to raise and lower the knife.

HAROLD A. DENMIRE.